(12) United States Patent
Kim (10) Patent No.: US 6,980,267 B1
(45) Date of Patent: *Dec. 27, 2005

(54) REFLECTIVE-TYPE LIQUID CRYSTAL DISPLAY DEVICE HAVING TWO UNIAXIAL COMPENSATION FILMS OF SAME TYPE AND METHOD FOR MAKING THE SAME

(75) Inventor: Yong Beom Kim, Kunpo-shi (KR)

(73) Assignee: LG.Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,510

(22) Filed: Sep. 24, 1997

(30) Foreign Application Priority Data

May 9, 1997 (KR) .................................. 97-17766
May 9, 1997 (KR) .................................. 97-17767

(51) Int. Cl.$^7$ ...................... G02F 1/1335; G02F 1/1337
(52) U.S. Cl. ...................... 349/113; 349/117; 349/119; 349/123
(58) Field of Search ...................... 349/113, 117–119, 349/123, 128–130

(56) References Cited

U.S. PATENT DOCUMENTS

| 4,405,208 | A | * | 9/1983 | Shirai ........................ 350/341 |
| 4,456,336 | A | * | 6/1984 | Chung et al. ............... 350/338 |
| 4,519,678 | A | * | 5/1985 | Komatsubara et al. ...... 350/338 |
| 4,701,028 | A | * | 10/1987 | Clerc et al. ................. 350/337 |
| 5,093,739 | A | * | 3/1992 | Aida et al. .................. 349/120 |
| 5,189,538 | A | * | 2/1993 | Arakawa ..................... 349/120 |
| 5,194,975 | A | * | 3/1993 | Akatsuka et al. ........... 349/119 |
| 5,196,953 | A | * | 3/1993 | Yeh et al. ..................... 359/73 |
| 5,220,444 | A | * | 6/1993 | Mitsui et al. ................. 359/70 |
| 5,237,438 | A | * | 8/1993 | Miyashita et al. ............ 359/73 |
| 5,249,071 | A | * | 9/1993 | Yoshimizu et al. ......... 349/102 |
| 5,406,396 | A | * | 4/1995 | Akatsuka et al. ........... 349/118 |
| 5,493,431 | A | * | 2/1996 | Baba et al. ................. 349/117 |
| 5,500,750 | A | * | 3/1996 | Kanbe et al. ............... 349/113 |
| 5,559,617 | A | * | 9/1996 | Mitsui et al. ................. 359/73 |
| 5,594,568 | A | * | 1/1997 | Abileah et al. ............. 349/120 |
| 5,684,551 | A | * | 11/1997 | Nakamura et al. ........... 349/99 |
| 5,754,267 | A | * | 5/1998 | Izumi ........................ 349/153 |
| 5,757,455 | A | * | 5/1998 | Sugiyama et al. .......... 349/129 |
| 5,793,459 | A | * | 8/1998 | Toko .......................... 349/129 |
| 5,815,230 | A | * | 9/1998 | Miura et al. ................ 349/129 |
| 5,870,164 | A | * | 2/1999 | Lu et al. ..................... 349/180 |
| 6,362,862 | B1 | * | 3/2002 | Itoh et al. ................... 349/119 |
| 6,417,892 | B1 | * | 7/2002 | Sharp et al. ................ 348/742 |
| 6,567,142 | B1 | * | 5/2003 | Kim ........................... 349/119 |

OTHER PUBLICATIONS

Patent Abstracts of Japan, Publication No. 08101380, Apr. 16, 1996.
Patent Abstracts of Japan, Publication No. 03226713, Oct. 7, 1991.

* cited by examiner

*Primary Examiner*—Tarifur R. Chowdhury
(74) *Attorney, Agent, or Firm*—McKenna Long & Aldridge LLP

(57) ABSTRACT

A reflective type liquid crystal display device Includes first and second substrates, a liquid crystal layer between the first and second substrates, and at least one uniaxial optical compensation film on the second substrate.

14 Claims, 9 Drawing Sheets

REFLECTIVE-TYPE LIQUID CRYSTAL DISPLAY DEVICE HAVING TWO UNIAXIAL COMPENSATION FILMS OF SAME TYPE AND METHOD FOR MAKING THE SAME

BACKGROUND OF THE INVENTION

A. Field of the Invention

This invention relates to a liquid crystal display device and, more particularly, a reflective-type liquid crystal display device.

B. Description of the Prior Art

Liquid crystal display devices ("LCDs") can be classified into TN (Twisted Nematic) type, GH (Guest Host) type, ECB (Electrically Controlled Birefringence) type and OCB (Optically Compensated Birefringence) type and so on, in accordance with the driving mode.

Recently, the TN-LCDs have been extensively used in devices such as the portable personal computer, measurement apparatus and the like. However, TN-LCDs, while having a number of advantages, also have the disadvantages of a narrow viewing angle and low response time.

When a voltage is applied to a liquid crystal cell, the birefringence index of the liquid crystal cell changes as the alignment of the liquid crystal molecules changes corresponding to the dielectric anisotropy of the liquid crystal.

A mode, called the ECB mode, induces a change in the light transmission to change the birefringence index of the liquid crystal cell. HAN (Hybrid-Aligned Nematic) mode LCDs are representative of the ECB-LCDs. HAN mode LCD's have the advantages of having a low driving voltage and the ability to display full color well. Studies of the HAN mode have been widely advanced in OCB mode LCDs using the optical change of the liquid crystal cell as well as ECB mode LCDs.

Figure 1:
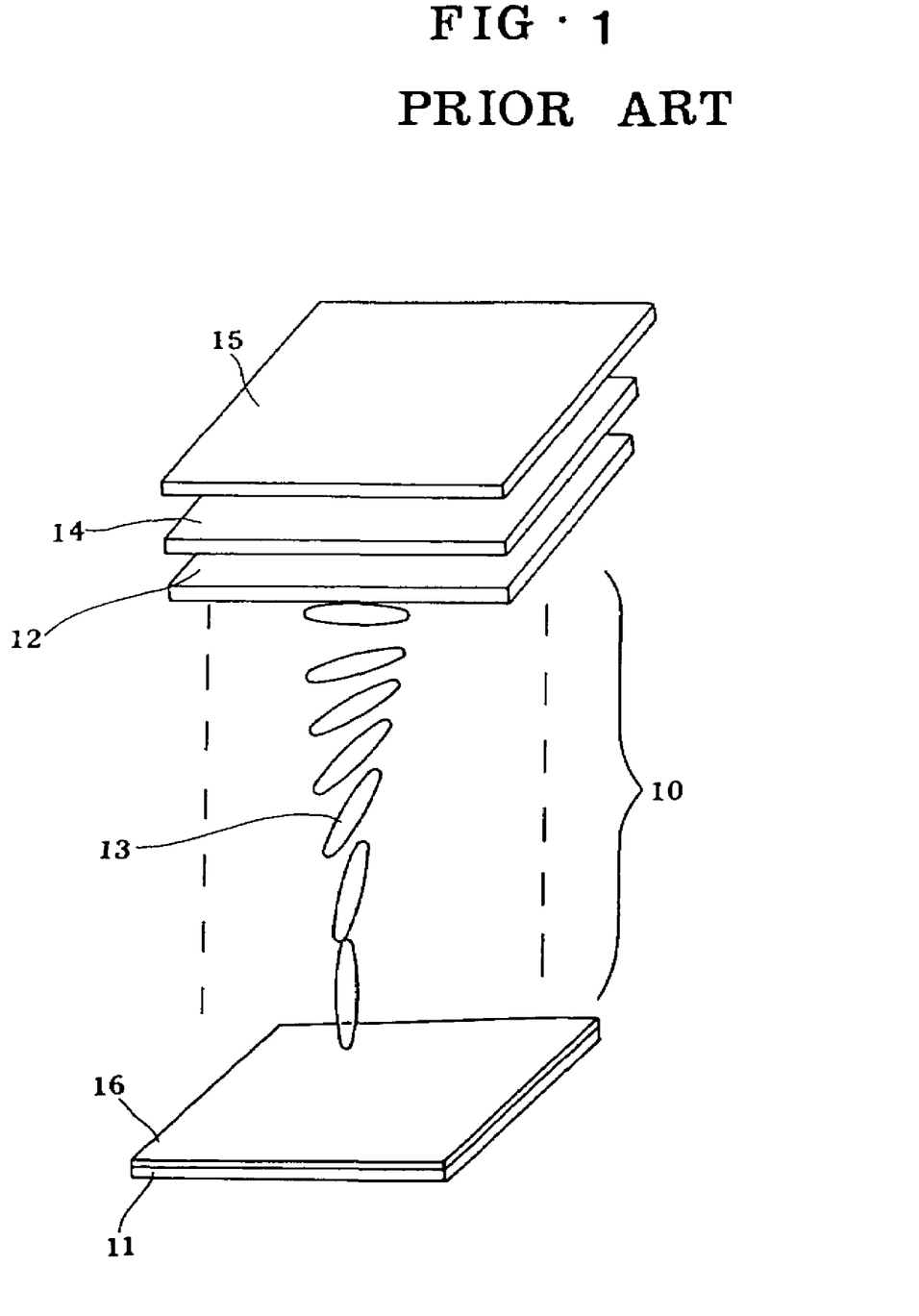
FIG. 1 is a schematic showing the traditional structure of a HAN mode ROCB-LCD.

FIG. 1 is drawing showing a schematic structure of a traditional reflective-type OCB-LCD (hereinafter ROCB-LCD) using HAN mode. The ROCB-LCD includes a first substrate 11 having a reflective electrode 16, a second substrate 12 onto which a biaxial retardation film 14 and a polarizer 15 are formed, and a liquid crystal layer 10 between first substrate 11 and second substrate 12. Movement of the liquid crystal display device having above-discussed structure will be explained in detail.

After incident light (not shown) passes through polarizer 15, biaxial retardation film 14, second substrate 12, and the liquid crystal layer 10 to compensate for phase changes due to viewing angles of a user, the incident light is reflected by reflective electrode 16 formed on first substrate 11. It is thereby possible for the user to achieve a desired image.

The above traditional HAN mode ROCB-LCDs, unlike the TN-LCD, have no restrictive condition to satisfy the first minimum condition regarding the viewing angle problems, i.e., $\Delta n \cdot d \geq \lambda/2$ (where $\Delta n$ is the refractive index, d is a thickness of the liquid crystal layer, and $\lambda$ is the wavelength of light), and since it is a SB(semi-bend) structure, there is no phase change of splay/bend. In the above HAN mode ROCB-LCD, a front scattering film can be attached on the polarizer 15, or a plurality of convex portions can be formed on the refractive electrode 16 in order to achieve a wide viewing angle.

The liquid crystal used in traditional HAN mode ROCB-LCDs has different light paths according to the y-z plane (including director) and x-z plane. In order to compensate the phase difference corresponding to the change in viewing angle of the user, the difference in the light path must be compensated by using a biaxial retardation film which has three reflective indices at the x, y, and z axes.

Therefore, the HAN mode ROCB-LCD using the biaxial retardation film has many advantages over the TN-LCD. However, gray is introduced by the decreased retardation of the liquid crystal when a voltage is applied to it. Further, the use of biaxial retardation films is disadvantageous due to manufacturing cost and the need to satisfy the complex condition demanded by the user.

SUMMARY OF THE INVENTION

In view of the foregoing, it is an object of the present invention to provide a HAN mode ROCB-LCD having a wide viewing angle and a method for making the same by using a negative uniaxial optical compensation film or positive uniaxial optical compensation film.

It is another object of the present invention to divide a pixel into two domains in order to effectively use the uniaxial optical compensation films.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes first and second substrates, a liquid crystal layer between the first and second substrates, and at least one uniaxial optical compensation film on the second substrate.

According to another aspect of the invention, the invention includes first and second substrates a liquid crystal layer between the first and second substrates, at least one uniaxial optical compensation film on the second substrate, and a first alignment layer over the first substrate, the first alignment layer having a plurality of alignment directions.

A method according to the invention includes providing first and second substrates, providing a liquid crystal layer between the first and second substrates, providing at least one uniaxial optical compensation film on the second substrate, and forming a first alignment layer over the first substrate, the first alignment layer having a plurality of alignment directions.

It is to be understood that both the foregoing general description and the following detailed description are exemplary and explanatory only and are not restrictive of the invention, as claimed.

The accompanying drawings, which are incorporated in and constitute a part of this specification, illustrate the embodiments of the invention and, together with the description, serve to explain the principles of the invention.

DESCRIPTION OF THE PREFERRED EMBODIMENTS

Reference will now be made In detail to the present preferred embodiments of the invention, examples of which are illustrated in the accompanying drawings. Wherever possible, the same reference numbers will be used throughout the drawings to refer to the same or like parts.

Figure 2:
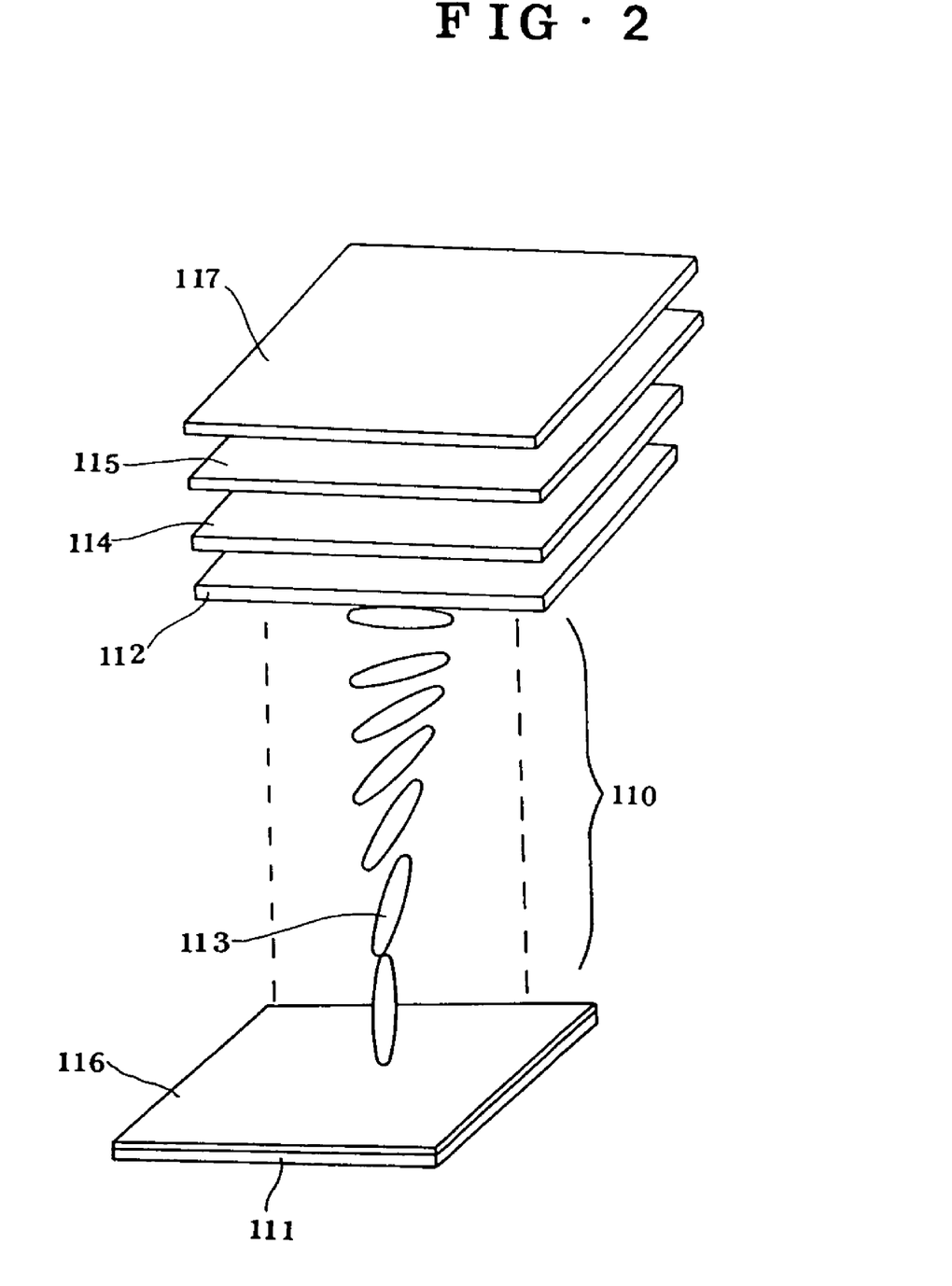
FIG. 2 is a schematic showing the structure of an LCD using two positive uniaxial optical compensation films according to a first embodiment of the present invention.

FIG. 2 is a schematic showing the structure of an LCD using two positive uniaxial optical compensation films according to a first embodiment of the present invention. As shown, the LCD in accordance with this invention includes a first substrate 111 having a reflective electrode 116, a second substrate 112 on which two positive uniaxial optical compensation films 114 and 115 and a polarizer 117 are formed, and a liquid crystal layer 110 between the first substrate 111 and the second substrate 112.

After incident light (not shown) passes through polarizer 117, the two positive uniaxial optical compensation films 114 and 115, second substrate 112, and liquid crystal layer 110, the incident light is reflected by reflective electrode 116 formed on first substrate 111. The reflected light then returns through the opposite path, whereby it is possible for a user to achieve a desired image. The two positive uniaxial optical compensation films compensate the phase difference which the user realizes at a direction normal to the substrate and at a direction corresponding to the change in viewing angle.

A method for manufacturing the LCD includes forming reflective electrode 116 by the deposit of opaque metal such Al on first substrate 111, forming a first alignment layer (not shown) on reflective electrode 116 by photo-alignment or mechanical alignment such as rubbing, forming films 114 and 115 and polarizer 117 on second substrate 112, forming a second alignment layer (not shown), and forming liquid crystal layer 110 between first substrate 111 and second substrate 112. Alignment conditions of the alignment layers are properly controlled according to the characteristics of the liquid crystal and desired term, with the second alignment layer formed in the same manner.

The relationship between phase difference and reflective index of two positive uniaxiai optical compensation films is satisfied by $\Delta n \cdot d = |(\Delta n_1 \cdot d_1) - (\Delta n_2 \cdot d_2)| = [(n_{x1} - n_{x2}) - (n_{x2} - n_{y2})] \cdot d$, where $\Delta n$ is a refractive index, d is a film thickness, $n_{x1}$ and $n_{x2}$ represent extra ordinary refractive indices; and $n_{y1}$ and $n_{y2}$ represent ordinary refractive indices. Preferably, each ordinary refractive index of the two films is the same and the phase difference between the two films is low.

Figure 3:
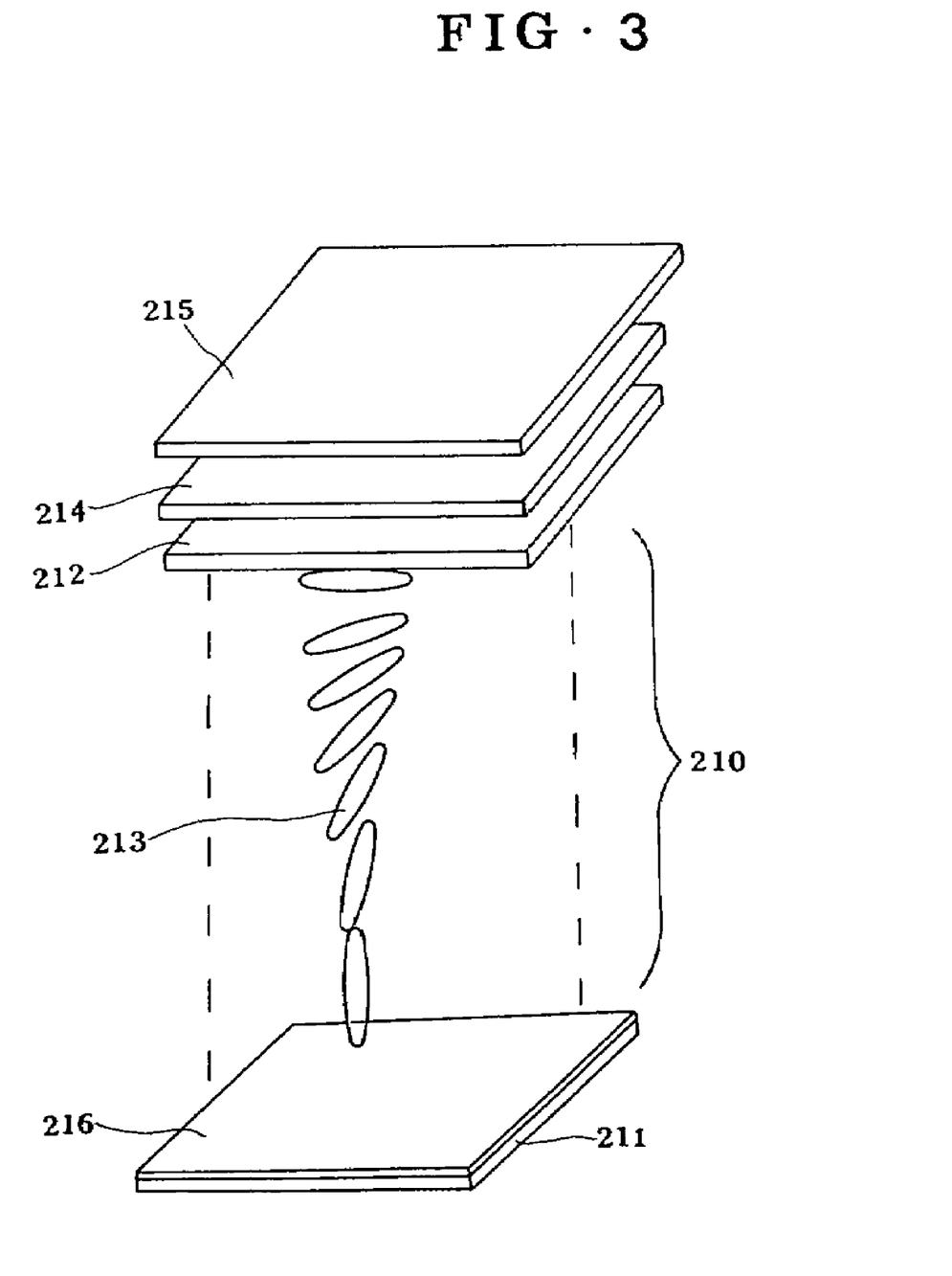
FIG. 3 is a schematic showing the structure of an LCD using one negative uniaxial optical compensation film according to a second embodiment of the present invention.

FIG. 3 is a schematic showing the structure of an LCD using one negative uniaxial optical compensation film according to a second embodiment of the present invention. As shown, the LCD in accordance with this embodiment includes a first substrate 211 having a reflective electrode 216, a second substrate 212 on which one negative uniaxial optical compensation film 214 and a polarizer 215 are formed, and a liquid crystal layer 210 between first substrate 211 and second substrate 212.

In the LCD having above-mentioned structure, after incident light (not shown) passes through polarizer 215, negative uniaxial optical compensation film 214, second substrate 212, and liquid crystal layer 210, the incident light is reflected by reflective electrode 216 formed on first substrate 211. Further, the reflected light returns in the opposite direction, whereby it is possible for user to achieve desired image. The negative uniaxial optical compensation film compensates the phase difference which the user realizes at a direction normal to the substrate and at a direction corresponding to the change in viewing angle.

A method for manufacturing the LCD proceeds in the same manner as for the first embodiment except one negative uniaxial optical compensation film is used instead of two positive uniaxial optical compensation films.

In the negative uniaxial optical compensation film, the relationship of each refractive index is satisfied by $n_x = n_y = n_o$, $n_z = n_e$ and $n_o > n_e$, where $n_x$ is a refractive index in the x-direction, $n_y$ is a refractive index in the y-direction. The light path difference of the liquid crystal layer corresponding to the change in polar angle can thus be overcome. Also, in the case where the surface of the reflective electrode forms a plurality of convex portions in order to increase brightness, the alignment direction of the alignment layer should be formed perpendicular to the substrate to achieve a wide viewing angle.

Figure 4:
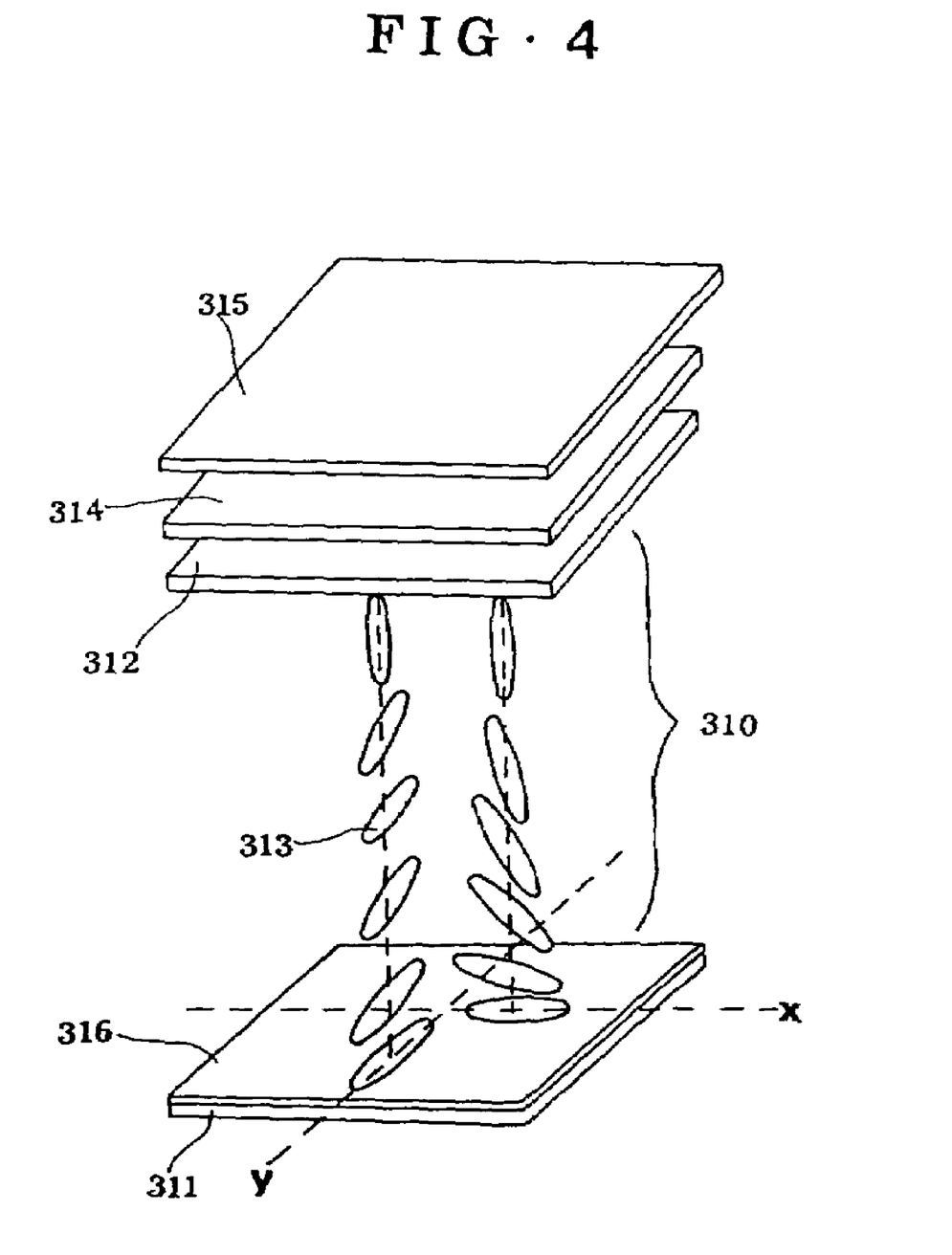
FIG. 4 is a schematic showing the structure of an LCD using a uniaxial optical compensation film according to a third embodiment of the present invention, in which one pixel is divided into two domains.

FIG. 4 is a schematic showing the structure of an LCD using a uniaxial optical compensation film according to a third embodiment of this invention, in which a pixel is divided two domains. The LCD includes a first substrate 311 having a reflective electrode 316, a second substrate 312 on which a uniaxial optical compensation film 314 (negative or positive type) and a polarizer 315 are formed, and a liquid crystal layer 310 between first substrate 311 and second substrate 312.

A method for manufacturing the LCD includes the steps of forming a reflective electrode 316 by the deposit of an opaque metal such as Al on first substrate 311, forming a first alignment layer (not shown) on reflective electrode 316 by photo-alignment with exposure to ultraviolet (UV) light, in which the alignment direction of the liquid crystal molecule by the first alignment layer is divided into two directions, x and y, wherein after the y (or x)-direction alignment process is executed, the x(or y)-direction alignment process is executed using a mask. Alignment conditions of the alignment layers are properly controlled according to the characteristics of the liquid crystal and the desired term. The uniaxial optical compensation film 314 and polarizer 315 are then formed on second substrate 312, and a second alignment layer (not shown) is formed by the same manner described above. As before, alignment conditions of the alignment layers are properly controlled according to the characteristics of the liquid crystal and the desired term.

Finally, liquid crystal layer 310 if formed between first substrate 311 and second substrate 312.

In the above-mentioned process, it is possible to expose UV light to at least one surface of the substrates using non-polarized light or partially polarized light. It is also possible to form the alignment direction using a mechanical method, such as rubbing, or by using a combination of photo alignment and mechanical method. For example, the alignment direction of the first alignment layer can be formed perpendicularly using photosensitive material, while the alignment direction of the second alignment layer is formed in parallel using the rubbing manner. A preferred method includes exposing the first or second alignment layer to ultraviolet light only once. As a result, a HAN mode ROCB-LCD having a pixel divided into two domains is obtained. Further, the structure of the first and second substrates are interchangeable, and it is possible to obtain the effect of this invention using a perpendicularly or horizontally (or laterally) aligned general polyimide alignment layer.

Hereinafter, preferred results of experiments according to this invention are described in detail with reference to the accompanying drawings.

Figure 5A:
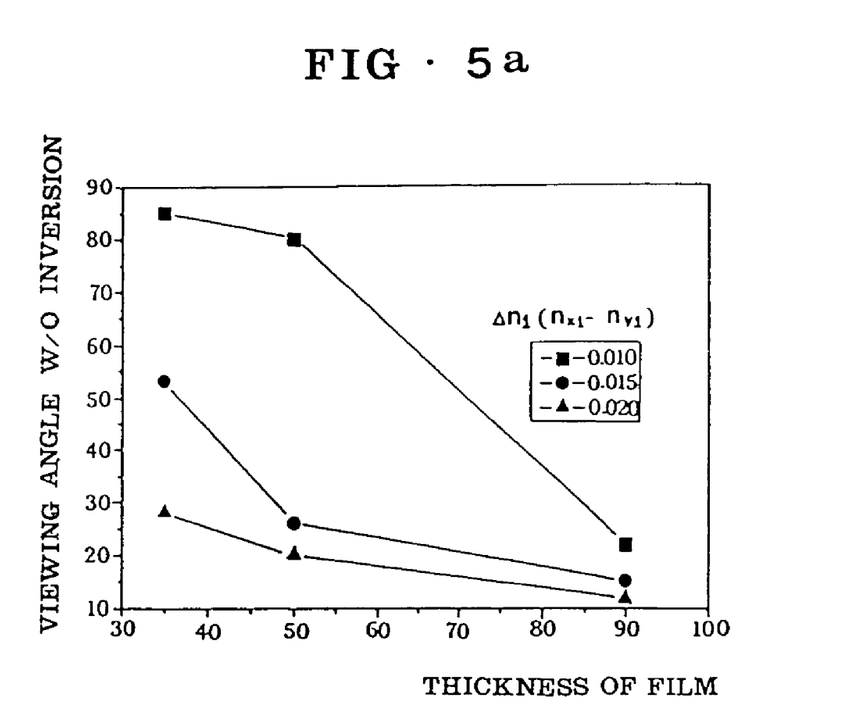
FIGS. 5a and 5b are graphs showing the change in viewing angle characteristic according to the change in other coefficients at an azimuth angle 45° (the direction of liquid crystal director) with a phase difference of 40 nm between two positive uniaxial optical compensation films.
Figure 5B:
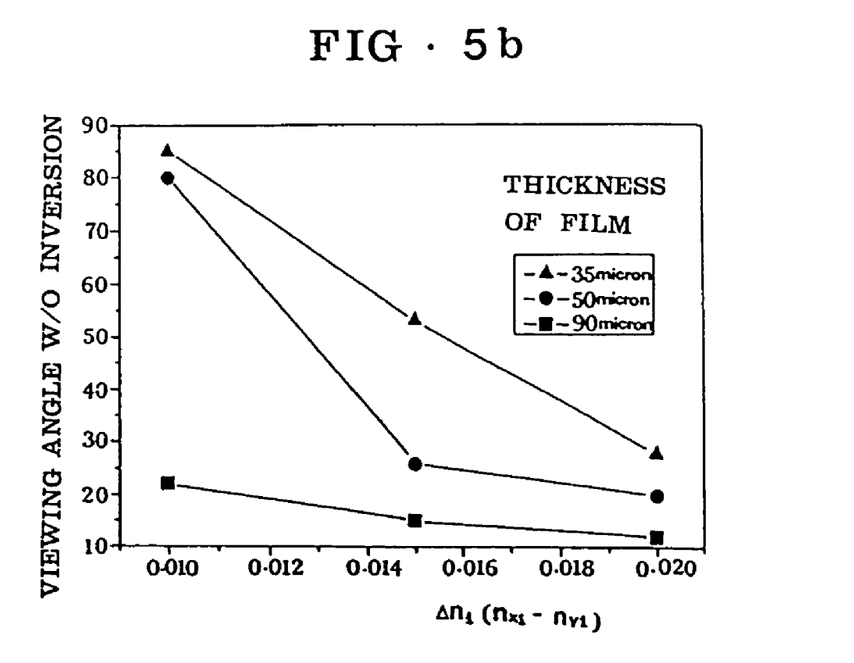

FIGS. 5a and 5b represent changes in the viewing angle characteristic according to changes in other coefficients wherein an azimuth angle of 45° and a phase difference ($\Delta n \cdot d$) of 40 nm are constantly maintained. However, $\Delta n_1$ ($n_{x1}-n_{y1}$) is changed to 0.01, 0.015, and 0.02, and the thickness of the two positive uniaxial optical compensation films is changed to 35, 50, and 90.

Figure 6A:
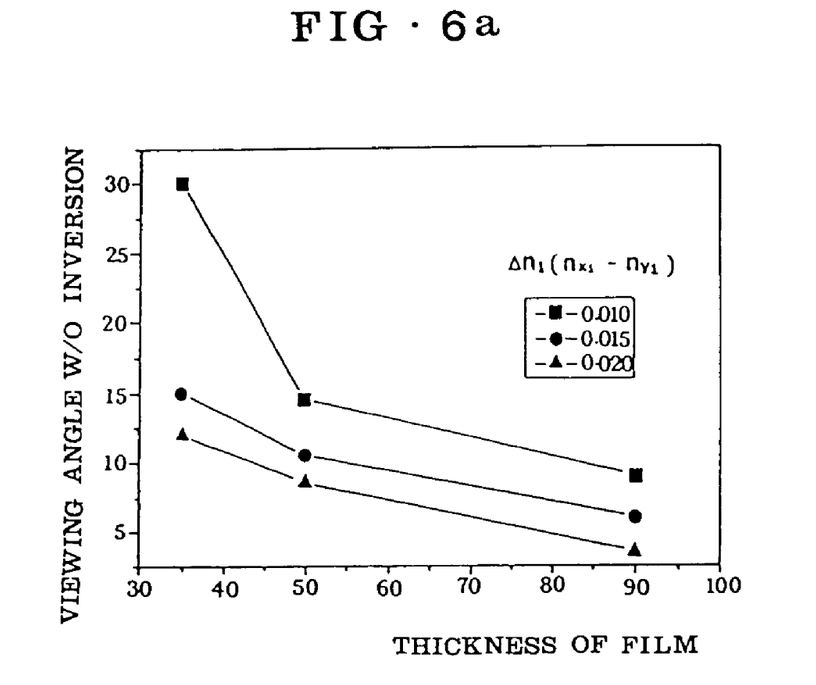
FIGS. 6a and 6b are graphs showing the change in viewing angle characteristic according to the change in other coefficients at an azimuth angle 135° (the perpendicular direction of liquid crystal director) with a phase difference of 40 nm between two positive uniaxial optical compensation films.
Figure 6B:
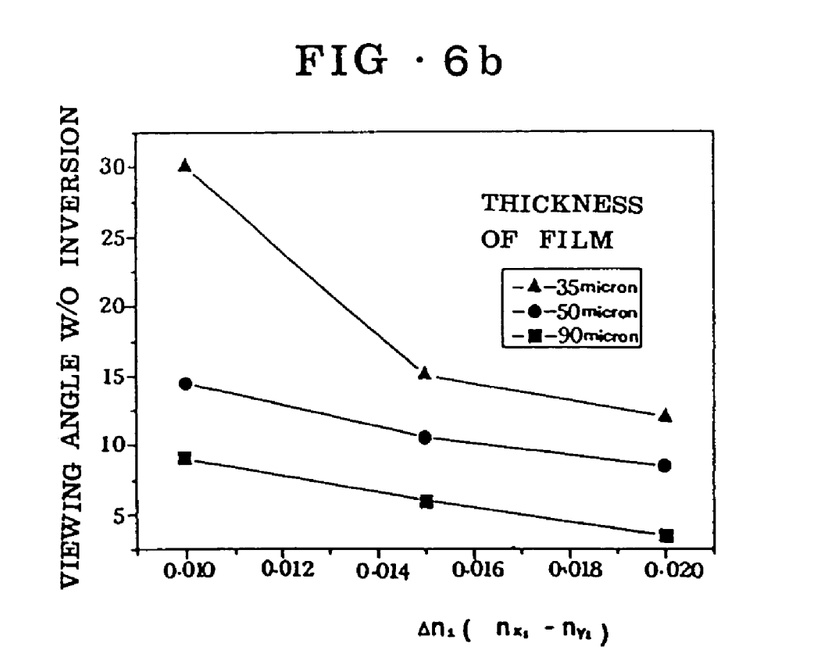

FIGS. 6a and 6b represent changes in the viewing angle characteristic according to changes in other coefficients wherein an azimuth angle of 135° and a phase difference ($\Delta n \cdot d$) of 40 nm are constantly maintained. However, $\Delta n_1$ ($n_{x1}-n_{y1}$) is changed to 0.01, 0.015, and 0.02, and thickness of the two positive uniaxial optical compensation films is changed to 35, 50, and 90.

Figure 7A:
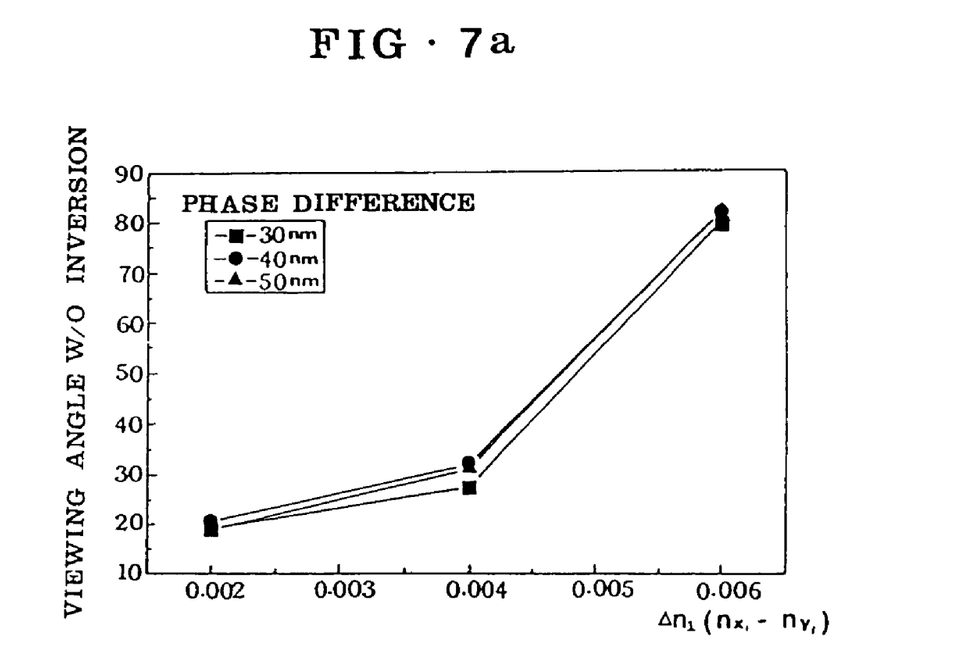
FIGS. 7a and 7b are graphs showing the change In viewing angle characteristic according to the change in other coefficients at an azimuth angle 45° with a film thickness of 50 um.
Figure 7B:
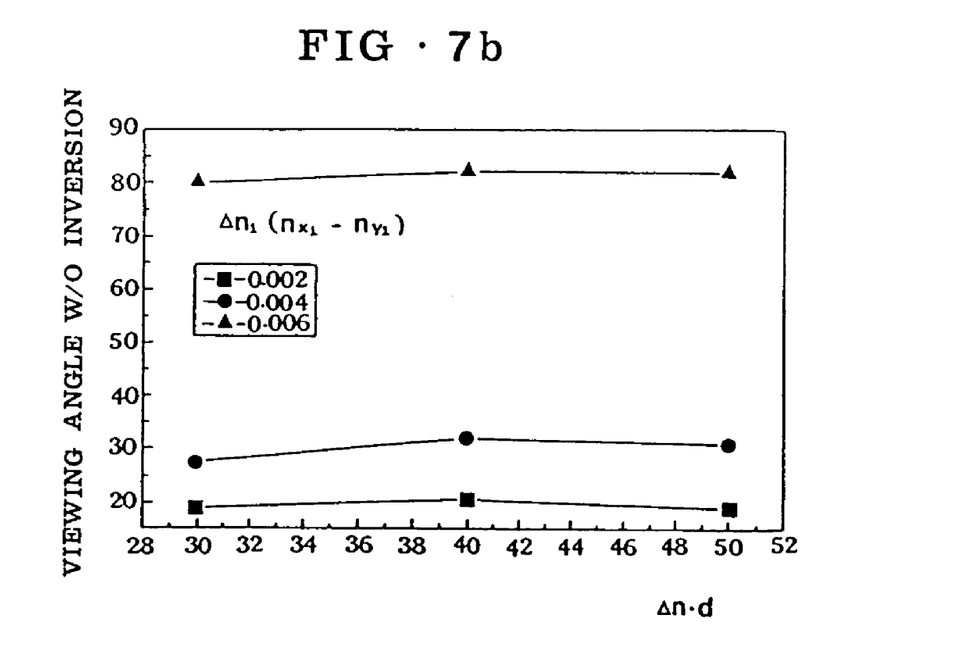

FIGS. 7a and 7b represent changes in viewing angle characteristic according to changes of other coefficients wherein an azimuth angle of 45° and a film thickness of 50 um are constantly maintained. However, $\Delta n_1(n_{x1}-n_{y1})$ is changed to 0.002, 0.004, and 0.006 and $\Delta n \cdot d$ is changed to 30, 40, and 50 nm. As shown, the viewing angle characteristic is increased corresponding to the increasing level of the two coefficients.

Figure 8A:
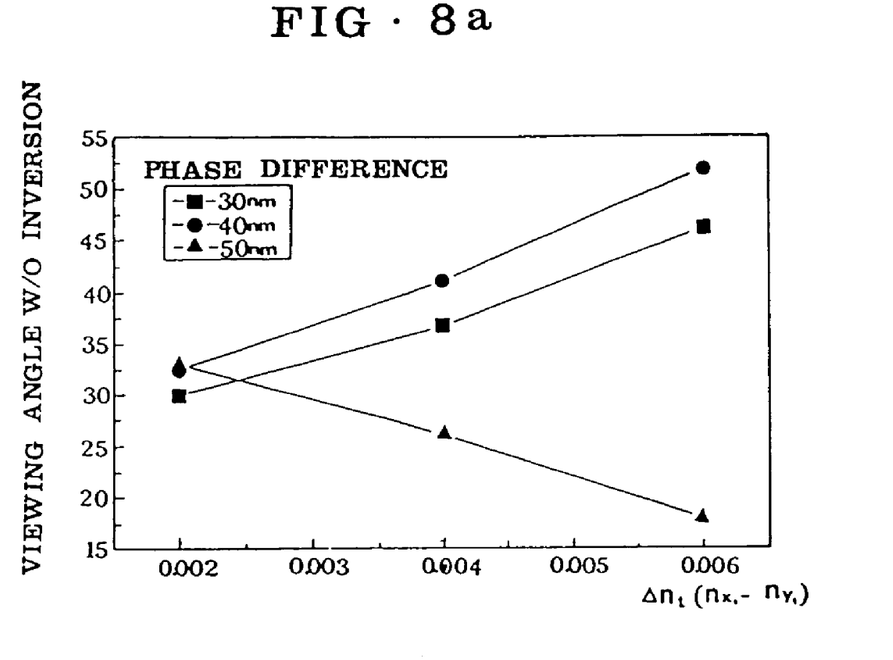
FIGS. 8a and 8b are graphs showing the change in viewing angle characteristic according to the change in other coefficients at an azimuth angle 135° with a film thickness of 40 um.
Figure 8B:
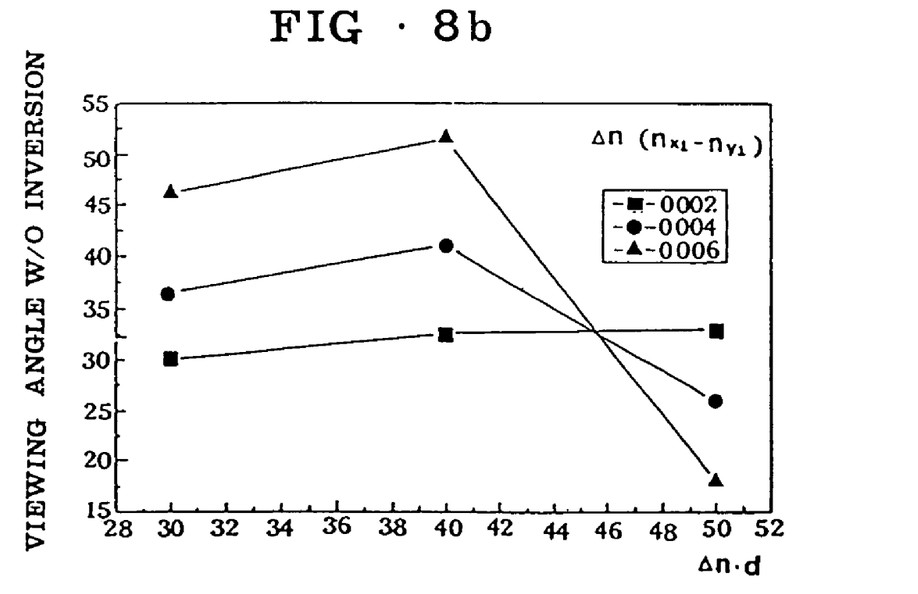

FIGS. 8a and 8b represent changes in viewing angle characteristic according to changes of other coefficients wherein an azimuth angle of 1350 and a film thickness of 50 um are constantly maintained. However, $\Delta n_1(n_{x1}-n_{y1})$ is changed to 0.002, 0.004, and 0.006 and $\Delta n \cdot d$ is changed to 30, 40, and 50 nm. As shown, the viewing angle characteristic is decreased corresponding to an increasing value of $\Delta n_1(n_{x1}-n_{y1})$ when $\Delta n \cdot d$ is 50 nm.

Figure 9:
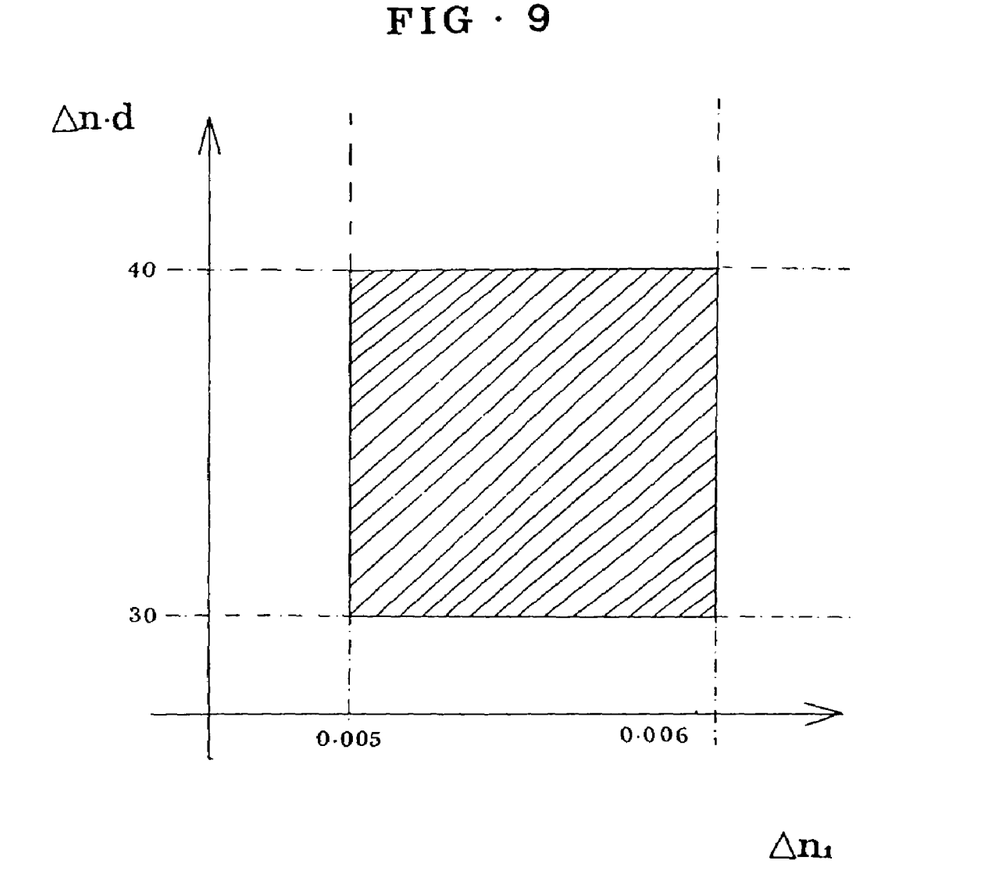
FIG. 9 is a graph showing the term of the ideal viewing angle characteristic represented by two positive uniaxial optical compensation films.

As a result, only when $\Delta n \cdot d$ is 30–40 nm and $\Delta n_1(n_{x1}-n_{y1})$ is 0.005–0.006, a viewing angle larger than 40° is achieved. This result is represented in FIG. 9 having a lined region which is the most ideal region.

In the experiment, changes in viewing angle characteristic are observed according to azimuth angle wherein the thickness of the liquid crystal cell is 45 um, pretilt angle is 3–4° and direction of liquid crystal director 45°.

Since the LCD according to the present invention uses uniaxial optical compensation films substituted for traditional biaxial optical compensation films, it is possible to achieve a wide viewing angle characteristic. Moreover, uniaxial films are cheaper and easier to manufacture than biaxial optical compensation films, thus reducing the cost of the LCD.

Furthermore, four domains can be achieved In transmission-type LCDs by dividing a pixel into two domains in accordance with the present invention. As a result, uniform optical characteristic is achieved without regard to the change of viewing angle of the user.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims and their equivalents.

What is claimed is:

1. A reflective-type liquid crystal display device, comprising:
first and second substrates;
a reflective electrode over the first substrate, wherein the reflective electrode comprises an opaque metal;
a liquid crystal layer disposed interjacent the first and second substrates;
two uniaxial optical compensation films of a same type over the second substrate, wherein an ordinary refractive index of each of the two uniaxial optical compensation films is the same, wherein a phase difference between the two compensation films is 30–40 nm, and wherein a difference in anisotropic refractive indices of an optical compensation film is 0.005–0.006 such that a viewing angle larger than 40° is achieved; and
a first alignment layer over the first substrate.

2. The device of claim 1, wherein said two uniaxial optical compensation films are positive-type.

3. The device of claim 1, wherein the first alignment layer includes multiple alignment directions.

4. A method of manufacturing a reflective-type liquid crystal display device, comprising:
providing first and second substrates;
forming a reflective electrode over the first substrate, wherein the reflective electrode comprises an opaque metal;
providing a liquid crystal layer disposed interjacent the first and second substrates;
providing two uniaxial optical compensation films of a same type over the second substrate, wherein an ordinary refractive index of each of the two uniaxial optical compensation films is the same, wherein a phase difference between the two compensation films is 30–40 nm and wherein a difference in anisotropic refractive indices of an optical compensation film is 0.005–0.006 such that a viewing angle larger than 40° is achieved; and
forming a first alignment layer over the first substrate.

5. The method of claim 4, wherein said two uniaxial optical compensation films are positive-type.

6. The method of claim 4, wherein said forming a first alignment layer includes exposing said first alignment layer to ultraviolet light to form a plurality of alignment directions.

7. The method of claim 4, wherein said forming a first alignment layer includes rubbing a surface of said first alignment layer to form a plurality of first alignment directions.

8. A reflective-type liquid crystal display device, comprising:
   first and second substrates;
   a reflective electrode over the first substrate;
   a liquid crystal layer disposed interjacent the first and second substrates;
   two uniaxial optical compensation films of a same type and shape over the second substrate, wherein an ordinary refractive index of each of the two uniaxial optical compensation films is the same, wherein a phase difference between the two compensation films is 30–40 nm, and wherein a difference in anisotropic refractive indices of an optical compensation film is 0.005–0.006 such that a viewing angle larger than 40° is achieved; and
   a first alignment layer over the first substrate.

9. The device of claim 8, wherein said two uniaxial optical compensation films are positive-type.

10. The device of claim 8, wherein the first alignment layer includes multiple alignment directions.

11. A method of manufacturing a reflective-type liquid crystal display device, comprising:
   providing first and second substrates;
   forming a reflective electrode over the first substrate;
   providing a liquid crystal layer disposed interjacent the first and second substrates;
   providing two uniaxial optical compensation films of a same type and shape over the second substrate, wherein an ordinary refractive index of each of the two uniaxial optical compensation films is the same, wherein a phase difference between the two compensation films is 30–40 nm, and wherein a difference in anisotropic refractive indices of an optical compensation film is 0.005–0.006 such that a viewing angle larger than 40° is achieved; and
   forming a first alignment layer over the first substrate.

12. The method of claim 11, wherein said two uniaxial optical compensation films are positive-type.

13. The method of claim 11, wherein said forming a first alignment layer includes exposing said first alignment layer to ultraviolet light to form a plurality of alignment directions.

14. The method of claim 11, wherein said forming a first alignment layer includes rubbing a surface of said first alignment layer to form a plurality of first alignment directions.

* * * * *